US012619265B2

(12) United States Patent
Tung et al.

(10) Patent No.: US 12,619,265 B2
(45) Date of Patent: May 5, 2026

(54) LIQUID LEVEL CONTROLLING APPARATUS

(71) Applicants:Inventec (Pudong) Technology Corp., Shanghai (CN); Inventec Corporation, Taipei (TW)

(72) Inventors: Kai-Yang Tung, Taipei (TW); Hung-Ju Chen, Taipei (TW)

(73) Assignees: Inventec (Pudong) Technology Corp., Shanghai (CN); Inventec Corporation, Taipei (TW)

( * ) Notice: Subject to any disclaimer, the term of this patent is extended or adjusted under 35 U.S.C. 154(b) by 838 days.

(21) Appl. No.: 17/986,787

(22) Filed: Nov. 14, 2022

(65) Prior Publication Data

US 2024/0077891 A1     Mar. 7, 2024

(30) Foreign Application Priority Data

Sep. 7, 2022     (CN) .......................... 202211090694.3

(51) Int. Cl.
*G05D 9/12* (2006.01)

(52) U.S. Cl.
CPC ...................................... *G05D 9/12* (2013.01)

(58) Field of Classification Search
CPC ................ G05D 9/12; Y10T 137/4807; Y10T 137/4857; Y10T 137/7303; Y10T 137/7306; Y10T 137/8342; Y10T 137/86035; H05K 7/20272
See application file for complete search history.

(56) References Cited

U.S. PATENT DOCUMENTS

| | | | | |
|---|---|---|---|---|
| 2,966,922 A | * | 1/1961 | Wallis ..................... | D06F 43/00 137/263 |
| 5,293,754 A | * | 3/1994 | Mizuno ................. | H01L 23/473 165/286 |
| 7,631,658 B2 | * | 12/2009 | Graeve, Jr. ............. | E03B 7/075 137/558 |
| 9,963,961 B2 | * | 5/2018 | Hardin ..................... | G05D 9/12 |
| 12,422,868 B2 | * | 9/2025 | Tung ........................ | G05D 9/12 |
| 2021/0015000 A1 | * | 1/2021 | Zhong ................ | H05K 7/20236 |
| 2023/0209781 A1 | * | 6/2023 | Gao .................... | H05K 7/20272 700/281 |

* cited by examiner

*Primary Examiner* — Hailey K. Do
(74) *Attorney, Agent, or Firm* — Winston Hsu

(57) ABSTRACT

A liquid level controlling system includes a main sink, a storage sink and a connection tube. The main sink includes a transmission port and a first liquid level detector. The transmission port is formed on a bottom of the main sink. The first liquid level detector is disposed on a top of the main sink. The storage sink includes a liquid outlet, a liquid inlet and a second liquid level detector. The connection tube is disposed between the main sink and the storage sink. The connection tube includes an rehydration tube and an drain tube. Two ends of the rehydration tube are respectively connected to the transmission port and the liquid outlet. Two ends of the drain tube are respectively connected to the transmission port and the liquid inlet.

15 Claims, 3 Drawing Sheets

LIQUID LEVEL CONTROLLING APPARATUS

BACKGROUND OF THE INVENTION

1. Field of the Invention

The present invention relates to a liquid level controlling system, and more particularly, to a liquid level controlling apparatus with preferred liquid level controllability.

2. Description of the Prior Art

The conventional immersion cooling system includes a two-phase cooling system with phase change and a single-phase cooling system without the phase change. The conventional immersion cooling systems need to ensure that the heating component is immersed in the non-conductive liquid; otherwise heat from the heating component cannot be exchanged with the non-conductive liquid for cooling. The liquid level of the cooling liquid in the storage tank of the conventional immersion cooling system is dropped when the heating component is removed from the storage tank; however, if additional cooling liquid is injected into the storage tank, or another heating component with a larger volume is placed in the storage tank, the liquid level of the cooling liquid in the storage tank exceeds an original standard. The liquid level rising phenomenon increases possibility of leaking the cooling liquid. The cooling liquid may easily contact the condenser inside the immersion cooling system due to the excessive liquid level, and heat dissipation efficiency of the condenser is decreased accordingly.

For controlling the liquid level in the storage tank, the conventional immersion cooling system disposes a liquid rehydration opening on the bottom of the storage tank, and further disposes a liquid drain opening on the top of the storage tank. The liquid level upper limit gauge and the liquid level lower limit gauge are disposed around the liquid drain opening. If the liquid level in the storage tank is lower than the lower limit of the liquid level, the pump is turned on to inhale the cooling liquid from the liquid rehydration opening; if the liquid level in the storage tank is higher than the upper limit of the liquid level, the cooling liquid is automatically drained from the storage tank through the liquid drain opening due to gravity. However, the heating components with different volumes correspond to different liquid levels of the cooling liquid inside the storage tank; position of the liquid level upper limit gauge and the liquid level lower limit gauge is limited to the fixed position of the liquid drain opening, and cannot be flexibly changed in accordance with the heating component with a specific volume in the storage tank.

SUMMARY OF THE INVENTION

The present invention provides a liquid level controlling apparatus with preferred liquid level controllability for solving above drawbacks.

According to the claimed invention, a liquid level controlling system includes a main sink, a storage sink and a connection tube. The main sink includes a transmission port and a first liquid level detector. The transmission port is disposed on a bottom portion of the main sink, and the first liquid level detector is disposed on a top portion of the main sink. The storage sink includes a liquid outlet, a liquid inlet and a second liquid level detector. The connection tube is disposed between the main sink and the storage sink. The connection tube includes a rehydration tube and a drain tube. Two ends of the rehydration tube are respectively connected to the transmission port and the liquid outlet. Two ends of the drain tube are respectively connected to the transmission port and the liquid inlet.

According to the claimed invention, the liquid level controlling system further includes a rehydration pump and a rehydration controller. The rehydration pump is disposed on the rehydration tube and adapted to transmit liquid from the storage sink to the main sink. The rehydration controller is disposed on the rehydration tube and adapted to turn on or turn off the rehydration pump. The liquid level controlling system further includes a drain pump and a drain controller. The drain pump is disposed on the drain tube and adapted to transmit liquid from the main sink to the storage sink. The drain controller is disposed on the drain tube and adapted to turn on or turn off the drain pump.

The liquid level controlling system of the present invention can dispose only one transmission port on the bottom portion of the main sink, and utilize the Y-type connection tube to connect the main sink and the storage sink, so that the cooling liquid can flow between the main sink and the storage sink through the rehydration tube and the drain tube of the connection tube. Because the transmission port can be located on the bottom portion of the main sink, position of the first liquid level detector inside the main sink can be freely changed in accordance with an actual demand, and the liquid level controlling system can be applied for a heating device with any volume. When the heating device with the unknown volume is put into the main sink, the liquid level controlling system can analyze the detection results of the first liquid level detector and the second liquid level detector to automatically execute a rehydration function or a drain function of the main sink, so as to ensure that the liquid levels of the main sink and the storage sink conform to the actual demand.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
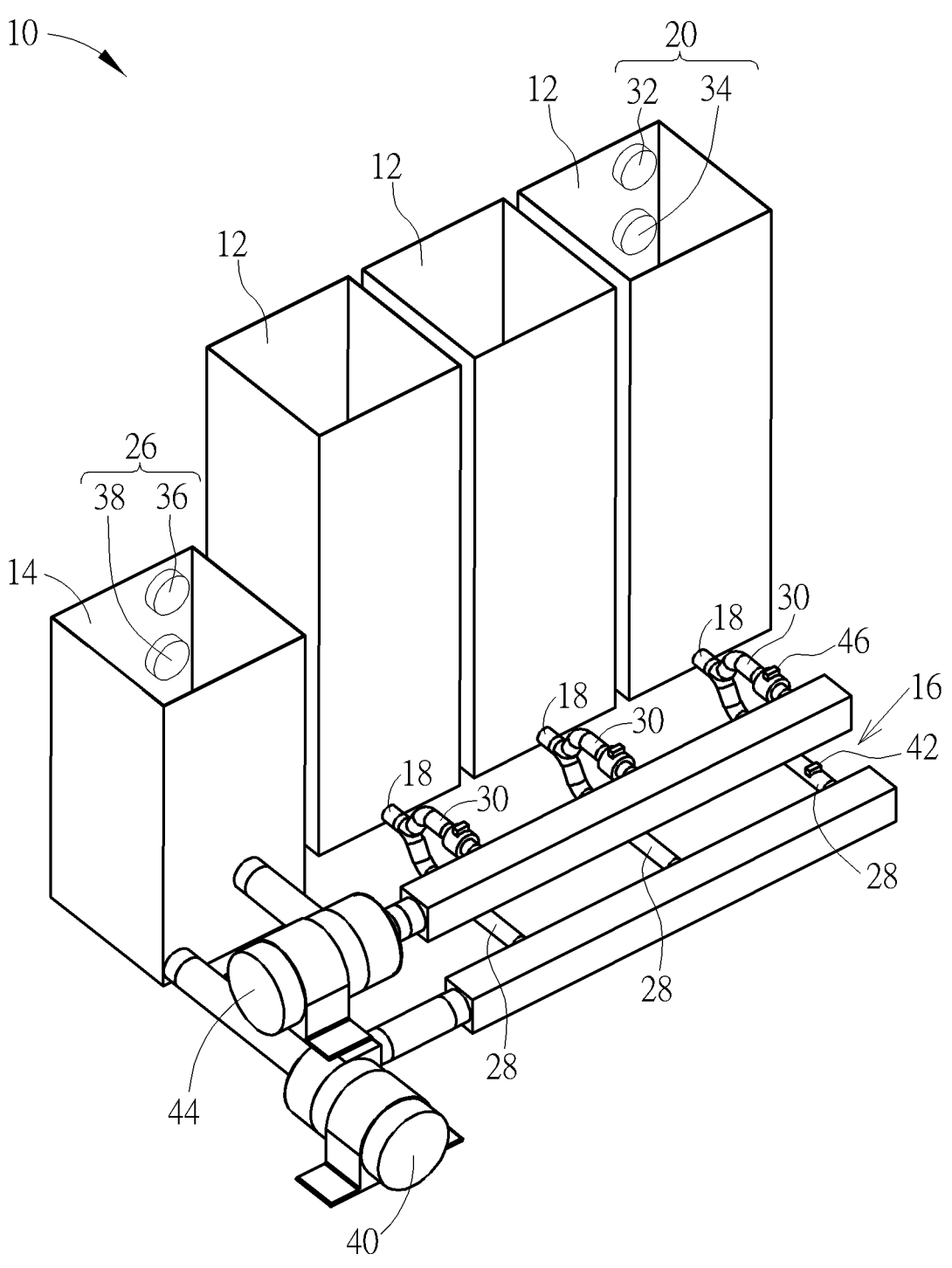
FIG. 1 is a diagram of a liquid level controlling system according to an embodiment of the present invention.
Figure 2:
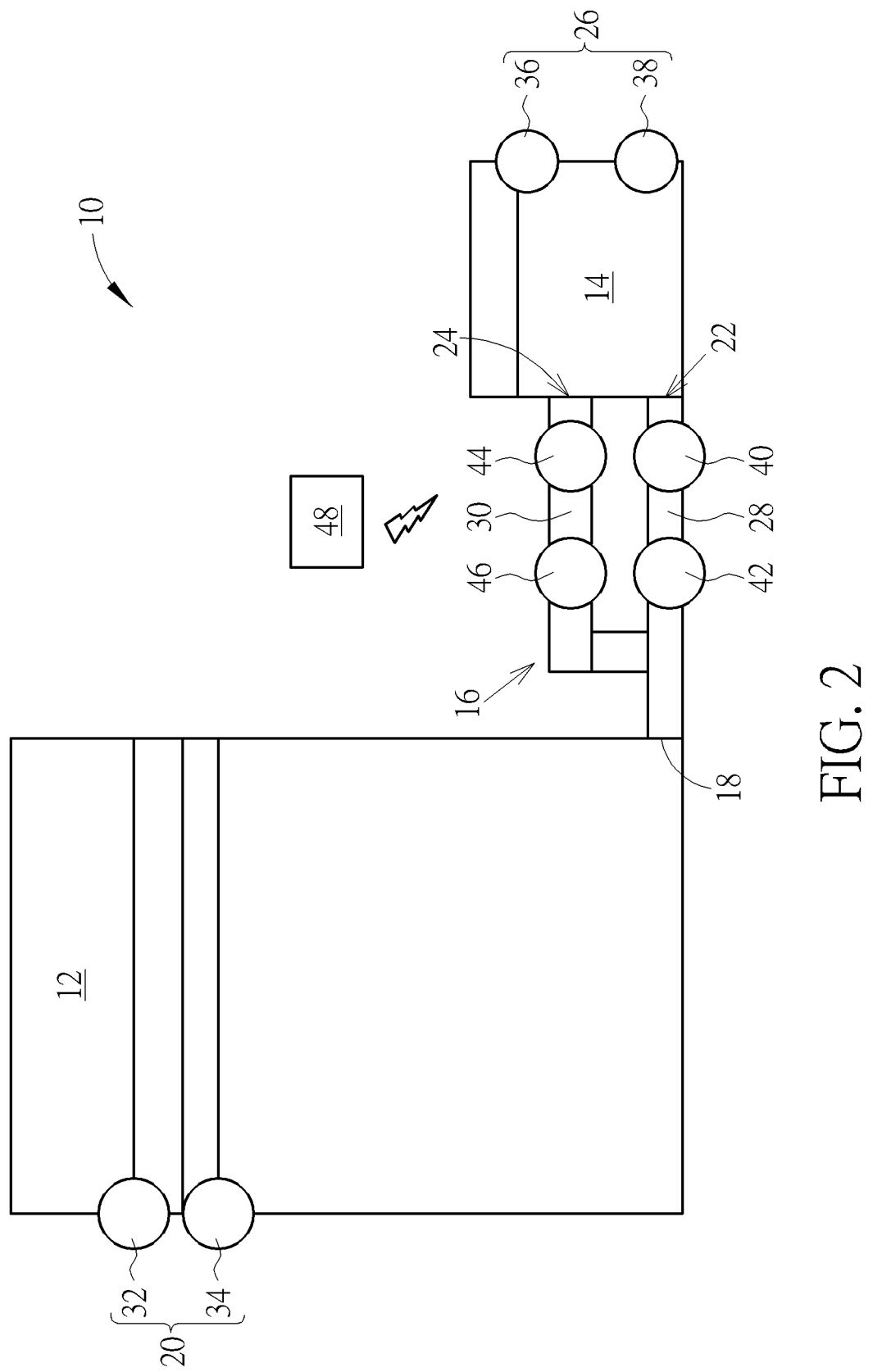
FIG. 2 is a diagram of parts of the liquid level controlling system according to the embodiment of the present invention.

Please refer to FIG. 1 and FIG. 2. FIG. 1 is a diagram of a liquid level controlling system 10 according to an embodiment of the present invention. FIG. 2 is a diagram of parts of the liquid level controlling system 10 according to the embodiment of the present invention. The liquid level controlling system 10 can include main sinks 12, a storage sink 14 and connection tubes 16. The main sink 12 can include a transmission port 18 and a first liquid level detector 20. The transmission port 18 can be preferably disposed on a bottom portion of the main sink 12. Cooling liquid can flow into and out of the main sink 12 through the transmission port 18. The first liquid level detector 20 can be disposed on a top portion of the main sink 12, and used to detect liquid level change of the cooling liquid inside the main sink 12. The liquid level controlling system 10 can utilize one storage sink 14 to replenish the cooling liquid into or remove the cooling liquid from a plurality of main sinks 12. A number of the main sink 12 can correspond to a number of the connection tube 16. Each connection tube 16 can be connected between the storage sink 14 and the corresponding main sink 12. Numbers of the main sink 12 and the connection tube 16 are not limited to the embodiment shown in the figures.

The storage sink 14 can include a liquid outlet 22, a liquid inlet 24 and a second liquid level detector 26. Position of the liquid outlet 22 can be lower than position of the liquid inlet 24, which depends on an actual demand. The connection tube 16 can be connected between the main sink 12 and the storage sink 14. The connection tube 16 can include a rehydration tube 28 and a drain tube 30. Two ends of the rehydration tube 28 can be respectively connected to the transmission port 18 and the liquid outlet 22 of the storage sink 14. Two ends of the drain tube 30 can be respectively connected to the transmission port 18 and the liquid inlet 24 of the storage sink 14.

In the embodiment, the first liquid level detector 20 can include a first liquid level gauge 32 and a second liquid level gauge 34, respectively disposed on a high position and a low position inside the main sink 12. For example, a distance of the first liquid level gauge 32 relative to the bottom portion of the main sink 12 can be greater than a distance of the second liquid level gauge 34 relative to the bottom portion of the main sink 12. The first liquid level gauge 32 can detect a liquid level upper limit of the main sink 12, and the second liquid level gauge 34 can detect a liquid level lower limit of the main sink 12. Position of at least one of the first liquid level gauge 32 and the second liquid level gauge 34 can be changed to adjust setting of the liquid level upper limit and the liquid level lower limit inside the main sink 12; the transmission port 18 is disposed adjacent to the bottom portion of the main sink 12, and therefore position change of the first liquid level gauge 32 and the second liquid level gauge 34 is not affected by the transmission port 18.

In other possible embodiments, the first liquid level detector 20 can be designed as a continuous liquid level gauge. A systematic setting value of the continuous liquid level gauge can be varied to adjust setting of the liquid level upper limit and the liquid level lower limit inside the main sink 12; an actual position of the first liquid level detector 20 is not changed manually or automatically.

The second liquid level detector 26 can include a first liquid level gauge 36 and a second liquid level gauge 38, respectively disposed on a high position and a low position inside the storage sink 14. For example, a distance of the first liquid level gauge 36 relative to the bottom portion of the storage sink 14 can be greater than a distance of the second liquid level gauge 38 relative to the bottom portion of the storage sink 14. The first liquid level gauge 36 can detect the liquid level upper limit of the storage sink 14, and the second liquid level gauge 38 can detect the liquid level lower limit of the storage sink 14. A setting manner of the liquid level upper limit and the liquid level lower limit inside the storage sink 14 can be the same as ones of the first liquid level detector 20, and a detailed description is omitted herein for simplicity. In addition, the second liquid level detector 26 can be designed as the continuous liquid level gauge.

The liquid level controlling system 10 can further includes a rehydration pump 40, a rehydration controller 42, a drain pump 44 and a drain controller 46. The rehydration pump 40 and the rehydration controller 42 can be disposed on the rehydration tube 28. The drain pump 44 and the drain controller 46 can be disposed on the drain tube 30. A flow direction of the rehydration pump 40 can be opposite to a flow direction of the drain pump 44. The rehydration pump 40 can transmit the liquid from the storage sink 14 to the main sink 12. The rehydration controller 42 can be used to turn on or turn off the rehydration pump 40. The drain pump 44 can transmit the liquid from the main sink 12 to the storage sink 14. The drain controller 46 can be used to turn on or turn off the drain pump 44.

The main sink 12 can design the transmission port 18 only on position adjacent to the bottom portion, and can be connected to the liquid outlet 22 and the liquid inlet 24 of the storage sink 14 via a Y-type tube. The rehydration tube 28 and the drain tube 30 of the connection tube 16 can be defined as two adjacent sections of the Y-type tube, and the transmission port 18 of the main sink 12 can be defined as a section of the Y-type tube opposite to the said two adjacent sections. Position of the first liquid level detector 20 inside the main sink 12 can be higher than position of the transmission port 18 inside the main sink 12, which means the liquid level upper limit and the liquid level lower limit of the main sink 12 can be higher than the transmission port 18. Besides, the liquid level lower limit of the storage sink 14 can be higher than the liquid outlet 22, so as to avoid that a gaseous matter is inhaled into the rehydration pump 40 and entering the main sink 12 through the rehydration tube 28. The liquid level upper limit of the storage sink 14 can be spaced from an opening of the storage sink 14, so as to avoid the liquid from overflowing from the opening of the storage sink 14.

The liquid level controlling system 10 can optionally include an operation processor 48 electrically connected to the first liquid level detector 20, the second liquid level detector 26, the rehydration controller 42 and the drain controller 46. The operation processor 48 can analyze detection results of the first liquid level detector 20 and the second liquid level detector 26, and output a corresponding control command to the rehydration controller 42 for driving the rehydration pump 40 or to the drain controller 46 for driving the drain pump 44. The operation processor 48 may be an external processor independent of the liquid level controlling system 10, and can be connected to inner electronic components of the liquid level controlling system 10 in a wire manner or in a wireless manner; further, the operation processor 48 may be a built-in processor of the liquid level controlling system 10. Application of the operation processor 48 can depend on a design demand, and a detailed description is omitted herein for simplicity.

Figure 3:
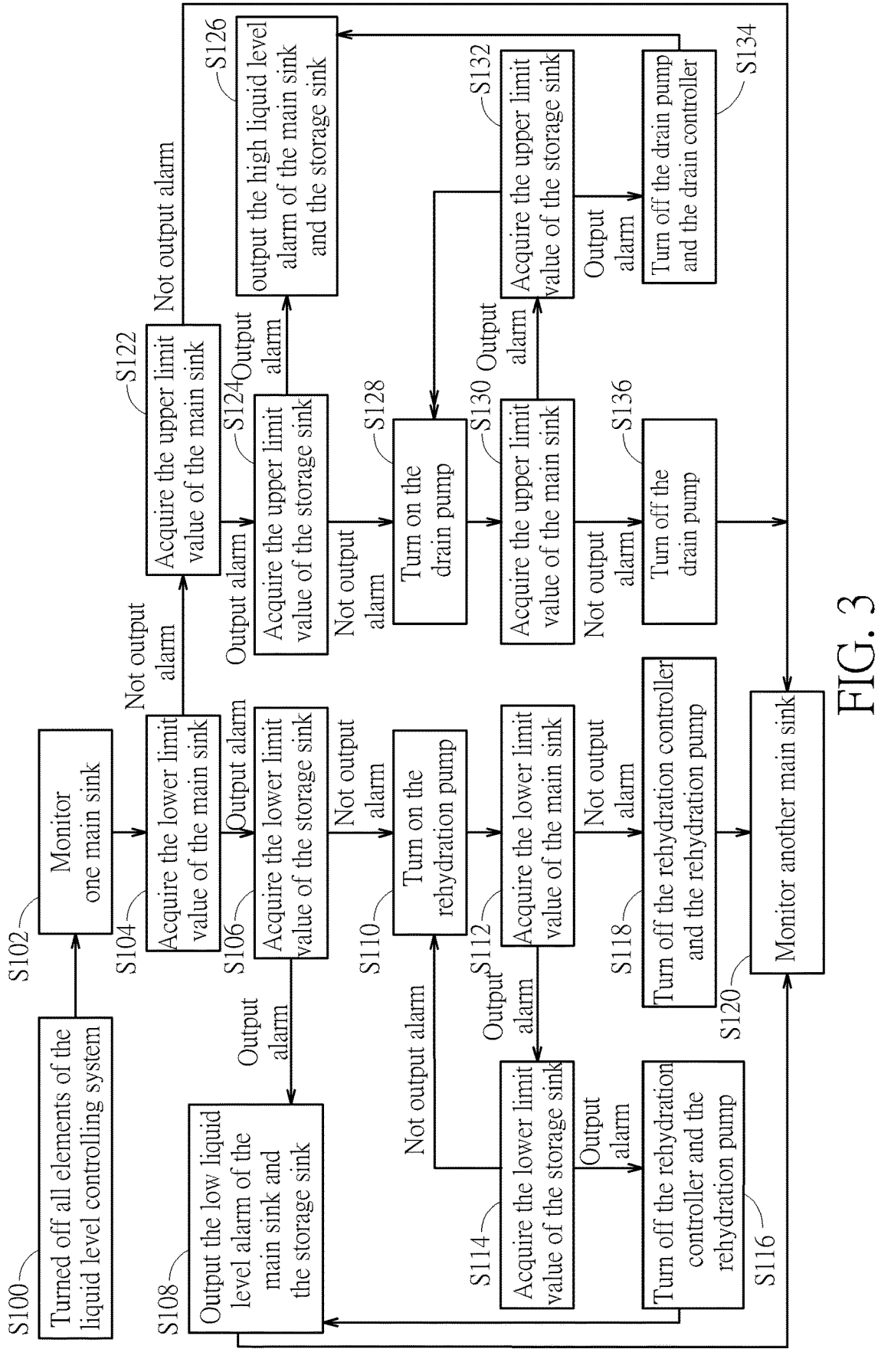
FIG. 3 is a flow chart of an operation method applied for the liquid level controlling system according to the embodiment of the present invention.

Please refer to FIG. 3. FIG. 3 is a flow chart of an operation method applied for the liquid level controlling system 10 according to the embodiment of the present invention. First, step S100 can be executed to turn off the rehydration pump 40, the rehydration controller 42, the drain pump 44 and the drain controller 46, and confirm that all elements of the liquid level controlling system 10 are in the turn-off mode. Then, step S102 and step S104 can be executed to select and monitor one of the plurality of main sinks 12, and acquire a first lower limit value of the selected main sink 12. If the first liquid level detector 20 outputs a first lower limit alarm, step S106 can be executed to acquire a second lower limit value of the storage sink 14. If the second liquid level detector 26 outputs a second lower limit alarm, step S108 can be executed to output a low liquid level alarm of the main sink 12 and the storage sink 14. If the second liquid level detector 26 does not output the second lower limit alarm, step S110 can be executed to turn on the rehydration pump 40 via the rehydration controller 42.

Step S112 can be executed after a while for acquiring the first lower limit value of the main sink 12. If the first liquid level detector 20 outputs the first lower limit alarm, step S114 can be executed to acquire the second lower limit value of the storage sink 14. If the second liquid level detector 26 does not output the second lower limit alarm, step S110 can be executed accordingly. If the second liquid level detector 26 outputs the second lower limit alarm, step S116 can be executed to turn off the rehydration controller 42 and the rehydration pump 40, and then execute step S108. If the first liquid level detector 20 does not output the first lower limit alarm, the liquid in the main sink 12 is sufficient, and step S118 and step S120 can be executed to turn off the rehydration controller 42 and the rehydration pump 40, and end a liquid level control process of the main sink 12 for monitoring another main sink 12 further.

After execution of step S104, step S122 can be executed to acquire a first upper limit value of the main sink 12 if the first liquid level detector 20 does not output the first lower limit alarm. If the first liquid level detector 20 still does not output the first upper limit alarm, step S120 can be executed to select and monitor another main sink 12. If the first liquid level detector 20 outputs the first upper limit alarm, step 124 can be executed to acquire a second upper limit value of the storage sink 14. If the second liquid level detector 26 outputs the second upper limit alarm, step S126 can be executed to turn off the drain pump 44 via the drain controller 46, and output a high liquid level alarm of the main sink 12 and the storage sink 14. If the second liquid level detector 26 does not output the second upper limit alarm, step S128 can be executed to turn on the drain pump 44 via the drain controller 46.

Then, step S130 can be executed after a while to acquire the first upper limit value of the main sink 12. If the first liquid level detector 20 outputs the first upper limit alarm, step S132 can be executed to acquire the second upper limit value of the storage sink 14. If the second liquid level detector 26 does not output the second upper limit alarm, step S128 can be executed accordingly. If the second liquid level detector 26 outputs the second upper limit alarm, step S134 can be executed to turn off the drain pump 44 and the drain controller 46, and then execute step S126. If the first liquid level detector 20 does not output the first upper limit alarm, step S136 can be executed to turn off the drain pump 44 via the drain controller 46, and end the liquid level control process of the main sink 12 and then execute step S120 for selecting and monitoring another main sink 12.

In conclusion, the liquid level controlling system of the present invention can dispose only one transmission port on the bottom portion of the main sink, and utilize the Y-type connection tube to connect the main sink and the storage sink, so that the cooling liquid can flow between the main sink and the storage sink through the rehydration tube and the drain tube of the connection tube. Because the transmission port can be located on the bottom portion of the main sink, position of the first liquid level detector inside the main sink can be freely changed in accordance with an actual demand, and the liquid level controlling system can be applied for a heating device with any volume. When the heating device with the unknown volume is put into the main sink, the liquid level controlling system can analyze the detection results of the first liquid level detector and the second liquid level detector to automatically execute a rehydration function or a drain function of the main sink, so as to ensure that the liquid levels of the main sink and the storage sink conform to the actual demand. In any possible embodiments of the present invention, the liquid level controlling apparatus of the present invention can be applied to a server, and the server can be used for the artificial intelligence (AI) computation, the edge computing algorithm, and can also be used as the 5G server, the cloud server or internet of vehicles server.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A liquid level controlling system comprising:
a main sink comprising a transmission port and a first liquid level detector, the transmission port being disposed on a bottom portion of the main sink, the first liquid level detector being disposed on a top portion of the main sink;
a storage sink comprising a liquid outlet, a liquid inlet and a second liquid level detector;
a connection tube disposed between the main sink and the storage sink, the connection tube comprising:
a rehydration tube, two ends of the rehydration tube being respectively connected to the transmission port and the liquid outlet; and
a drain tube, two ends of the drain tube being respectively connected to the transmission port and the liquid inlet;
a rehydration pump disposed on the rehydration tube and configured to transmit liquid from the storage sink to the main sink;
a rehydration controller being a control circuit disposed on the rehydration tube and electrically coupled to the rehydration pump and configured to turn on or turn off the rehydration pump;
a drain pump disposed on the drain tube and configured to transmit liquid from the main sink to the storage sink; and
a drain controller being another control circuit disposed on the drain tube and electrically coupled to the drain pump and configured to turn on or turn off the drain pump.

2. The liquid level controlling system of claim 1, wherein the first liquid level detector is a continuous liquid level gauge adapted to detect a liquid level upper limit and a liquid level lower limit inside the main sink.

3. The liquid level controlling system of claim 1, wherein the first liquid level detector comprises a first liquid level gauge and a second liquid level gauge respectively disposed on a high position and a low position inside the main sink, and adapted to detect a liquid level upper limit and a liquid level lower limit inside the main sink.

4. The liquid level controlling system of claim 1, wherein position of the liquid outlet is lower than position of the liquid inlet.

5. The liquid level controlling system of claim 1, wherein the second liquid level detector is a continuous liquid level gauge adapted to detect a liquid level upper limit and a liquid level lower limit inside the storage sink.

6. The liquid level controlling system of claim 1, wherein the second liquid level detector comprises a first liquid level gauge and a second liquid level gauge respectively disposed on a high position and a low position inside the storage sink, and adapted to detect a liquid level upper limit and a liquid level lower limit inside the storage sink.

7. The liquid level controlling system of claim 1, wherein the liquid level controlling system further comprises a plurality of main sinks and a plurality of connection tubes, each connection tube is connected between the storage sink and a corresponding main sink of the plurality of main sinks.

8. The liquid level controlling system of claim 1, further comprising:

an operation processor electrically connected to the drain controller, the operation processor analyzing detection results of the first liquid level detector and the second liquid level detector, and output a corresponding control command to the rehydration controller for driving the rehydration pump or to the drain controller for driving the drain pump.

9. The liquid level controlling system of claim 8, wherein the operation processor is adapted to not turn on the rehydration pump and the drain pump when the first liquid level detector does not output a first lower limit alarm and a first upper limit alarm.

10. The liquid level controlling system of claim 8, wherein the operation processor is adapted to turn on the rehydration pump via the rehydration controller when the first liquid level detector outputs a first lower limit alarm and the second liquid level detector does not output a second lower limit alarm.

11. The liquid level controlling system of claim 10, wherein the operation processor is adapted to turn off the rehydration pump via the rehydration controller and output a low liquid level alarm of the main sink and the storage sink when the first liquid level detector outputs the first lower limit alarm and the second liquid level detector outputs the second lower limit alarm.

12. The liquid level controlling system of claim 10, wherein the operation processor is adapted to turn off the rehydration pump via the rehydration controller and end a liquid level control process of the main sink when the first liquid level detector does not output the first lower limit alarm.

13. The liquid level controlling system of claim 8, wherein the operation processor is adapted to turn on the drain pump via the drain controller when the first liquid level detector outputs a first upper limit alarm and the second liquid level detector does not output a second upper limit alarm.

14. The liquid level controlling system of claim 13, wherein the operation processor is adapted to turn off the drain pump via the drain controller and output a high liquid level alarm of the main sink and the storage sink when the first liquid level detector outputs the first upper limit alarm and the second liquid level detector outputs the second upper limit alarm.

15. The liquid level controlling system of claim 13, wherein the operation processor is adapted to turn off the drain pump via the drain controller and end a liquid level control process of the main sink when the first liquid level detector does not output the first upper limit alarm.

* * * * *